(12) United States Patent
Niina et al.

(10) Patent No.: US 10,522,877 B2
(45) Date of Patent: Dec. 31, 2019

(54) POSITIVE ELECTRODE FOR NONAQUEOUS ELECTROLYTE SECONDARY BATTERY AND NONAQUEOUS ELECTROLYTE SECONDARY BATTERY

(71) Applicant: Sanyo Electric Co., Ltd., Daito-shi, Osaka (JP)

(72) Inventors: Fumiharu Niina, Hyogo (JP); Kazunari Ookita, Osaka (JP)

(73) Assignee: SANYO Electric Co., Ltd., Daito-shi (JP)

( * ) Notice: Subject to any disclaimer, the term of this patent is extended or adjusted under 35 U.S.C. 154(b) by 42 days.

(21) Appl. No.: 15/327,137

(22) PCT Filed: Jul. 7, 2015

(86) PCT No.: PCT/JP2015/003401
§ 371 (c)(1),
(2) Date: Jan. 18, 2017

(87) PCT Pub. No.: WO2016/017073
PCT Pub. Date: Feb. 4, 2016

(65) Prior Publication Data
US 2017/0141441 A1   May 18, 2017

(30) Foreign Application Priority Data

Jul. 30, 2014 (JP) ................................. 2014-154466

(51) Int. Cl.
*H01M 10/42* (2006.01)
*H01M 4/131* (2010.01)
(Continued)

(52) U.S. Cl.
CPC ....... *H01M 10/4235* (2013.01); *H01M 4/131* (2013.01); *H01M 4/366* (2013.01);
(Continued)

(58) Field of Classification Search
CPC ....... H01M 10/4235; H01M 2004/028; H01M 4/131; H01M 4/366; H01M 4/505; H01M 4/525; H01M 4/62
See application file for complete search history.

(56) References Cited

U.S. PATENT DOCUMENTS

2006/0147809 A1   7/2006 Amine et al.
2012/0213920 A1*  8/2012 Yanagita ............. H01M 4/0404
                                            427/126.6
(Continued)

FOREIGN PATENT DOCUMENTS

CN      102714313 A    10/2012
JP      2010-40383 A    2/2010
(Continued)

OTHER PUBLICATIONS

Scientific & Technical Information Center (STIC) search results from Changqing Li, Feb. 16, 2018 (Year: 2018).*
(Continued)

*Primary Examiner* — Stewart A Fraser
*Assistant Examiner* — Victoria H Lynch
(74) *Attorney, Agent, or Firm* — Westerman, Hattori, Daniels & Adrian, LLP (57) ABSTRACT

There is provided a positive electrode for nonaqueous electrolyte secondary batteries in which a decrease in the initial charge capacity can be suppressed even when a positive electrode exposed to the air is used. A positive electrode for a nonaqueous electrolyte secondary battery according to an aspect of the present invention contains a lithium transition metal composite oxide represented by general formula $Li_{1+x}Mn_aM_bO_{2+c}$ (in the formula, x, a, b, and c satisfy $x+a+b=1$, $0<x\leq0.2$, $0.09\leq a$, and $-0.1\leq c\leq0.1$, and M is at least one element selected from the group consisting of transition metal elements other than Mn, alkali metal elements, alkaline-earth metal elements, group 12 elements, group 13 elements, and group 14 elements) and also contains tungsten oxide and a phosphate compound.

13 Claims, 1 Drawing Sheet

(51) Int. Cl.
*H01M 4/505* (2010.01)
*H01M 4/62* (2006.01)
*H01M 4/36* (2006.01)
*H01M 4/525* (2010.01)
*H01M 4/02* (2006.01)

(52) U.S. Cl.
CPC .......... *H01M 4/505* (2013.01); *H01M 4/525* (2013.01); *H01M 4/62* (2013.01); *H01M 2004/028* (2013.01)

(56) References Cited

U.S. PATENT DOCUMENTS

2013/0011726 A1   1/2013   Takano et al.
2015/0221933 A1   8/2015   Mizawa et al.

FOREIGN PATENT DOCUMENTS

JP   2012-23015 A    2/2012
JP   2012-195239 A   10/2012

OTHER PUBLICATIONS

Scientific & Technical Information Center (STIC) search results from Julia Wang, Jul. 22, 2019 (Year: 2019).*
English translation of Search Report dated Sep. 4, 2018, issued in counterpart Chinese Application No. 201580041168.X. (2 pages).
International Search Report dated Oct. 13, 2015, issued in counterpart International Application No. PCT/JP2015/003401 (2 pages).

* cited by examiner

POSITIVE ELECTRODE FOR NONAQUEOUS ELECTROLYTE SECONDARY BATTERY AND NONAQUEOUS ELECTROLYTE SECONDARY BATTERY

TECHNICAL FIELD

The present invention relates to a positive electrode for nonaqueous electrolyte secondary batteries and a nonaqueous electrolyte secondary battery.

BACKGROUND ART

With the recent accelerated reduction in the size and weight of mobile information terminals such as cellar phones, notebook computers, and smartphones, secondary batteries serving as driving power supplies have been required to have a higher capacity. Nonaqueous electrolyte secondary batteries, which are charged and discharged by the movement of lithium ions between positive and negative electrodes, have a high energy density and a high capacity and therefore are widely used as driving power supplies for the above mobile information terminals.

Furthermore, nonaqueous electrolyte secondary batteries have recently attracted attention as power supplies for driving, for example, power tools, electric vehicles (EVs), and hybrid electric vehicles (HEVs, PHEVs) and are promising for various uses. Such power supplies for driving are required to have a higher capacity that allows long-term operation and improved output characteristics in the case where charge and discharge are repeatedly performed with a large current within a relatively short time.

In particular, when nonaqueous electrolyte secondary batteries are used as power tools, EVs, HEVs, PHEVs, and the like, a higher capacity needs to be achieved while output characteristics during charge and discharge with a large current are maintained.

For example, PTL 1 discloses that gas generation inside a battery during storage can be suppressed by coating a composite oxide mainly made of lithium nickelate with a tungstate compound and a phosphate compound and performing heat treatment.

CITATION LIST

Patent Literature

PTL 1: Japanese Published Unexamined Patent Application No. 2010-40383

SUMMARY OF INVENTION

Technical Problem

However, it has been found that the use of the technique disclosed in PTL 1 still poses a problem in that a decrease in the initial charge capacity cannot be suppressed when the positive electrode active material and the positive electrode are exposed to the air.

According to an aspect of the present invention, it is an object to provide a positive electrode for nonaqueous electrolyte secondary batteries and a positive electrode active material for nonaqueous electrolyte secondary batteries in which a decrease in the initial charge capacity is suppressed even when a positive electrode active material or a positive electrode exposed to the air is used.

Solution to Problem

According to an aspect of the present invention, a positive electrode for a nonaqueous electrolyte secondary battery contains a lithium transition metal composite oxide represented by general formula $Li_{1+x}Mn_aM_bO_{2+c}$ (in the formula, x, a, b, and c satisfy $x+a+b=1$, $0<x\leq0.2$, $0.09\leq a$, and $-0.1\leq c\leq0.1$, and M is at least one element selected from the group consisting of transition metal elements other than Mn, alkali metal elements, alkaline-earth metal elements, group 12 elements, group 13 elements, and group 14 elements), and also contains tungsten oxide and a phosphate compound.

Advantageous Effects of Invention

According to an aspect of the present invention, there can be provided a positive electrode for nonaqueous electrolyte secondary batteries and a nonaqueous electrolyte secondary battery in which a decrease in the initial charge is suppressed even when a positive electrode active material or a positive electrode exposed to the air is used.

DESCRIPTION OF EMBODIMENTS

An embodiment of the present invention will be described below. The embodiment is merely an example for carrying out the present invention, and the present invention is not limited to the embodiment.

[Positive Electrode]

A positive electrode for nonaqueous electrolyte secondary batteries according to an embodiment of the present invention contains a lithium transition metal composite oxide represented by general formula $Li_{1+x}Mn_aM_bO_{2+c}$ (in the formula, x, a, b, and c satisfy $x+a+b=1$, $0<x\leq0.2$, $0.09\leq a$, and $-0.1\leq c\leq0.1$, and M is at least one element selected from the group consisting of transition metal elements other than Mn, alkali metal elements, alkaline-earth metal elements, group 12 elements, group 13 elements, and group 14 elements), and tungsten oxide and a phosphate compound.

The positive electrode suitably includes a positive electrode current collector and a positive electrode mixture layer formed on the positive electrode current collector. The positive electrode current collector is formed of, for example, a conductive thin film such as a metal foil or alloy foil of aluminum or the like which is stable in the potential range of a positive electrode or a film including a metal surface layer made of aluminum or the like. The positive electrode mixture layer preferably contains a binding agent and a conductive agent, in addition to the positive electrode active material particles.

The degradation of the characteristics due to air exposure results from a LiOH production reaction. Specifically, Li in a surface layer of the lithium transition metal composite oxide is replaced with hydrogen through a reaction of moisture present on the surface of the lithium transition metal composite oxide with the lithium transition metal composite oxide. Thus, Li is extracted from the lithium transition metal composite oxide and LiOH is produced.

However, if tungsten oxide is present near the surface of the lithium transition metal composite oxide, the LiOH production reaction is suppressed. Therefore, the degradation of the initial charge characteristics due to air exposure, that is, the decrease in the charge capacity during charge after air exposure can be suppressed.

Furthermore, when a phosphate compound is added to a positive electrode containing a lithium transition metal composite oxide represented by general formula $Li_{1+x}Mn_aM_bO_{2+c}$ (in the formula, x, a, b, and c satisfy x+a+b=1, 0<x≤0.2, 0.09≤a, and −0.1≤c≤0.1, and M is at least one element selected from the group consisting of transition metal elements other than Mn, alkali metal elements, alkaline-earth metal elements, group 12 elements, group 13 elements, and group 14 elements), a specific interaction of $Mn^{4+}$ and $P_xO_y^{n-}$ (x, y, and n represent any number) is generated, which suppresses the adsorption of moisture in the air to the lithium transition metal composite oxide.

This is an interaction obtained when the general formula $Li_{1+x}Mn_aM_bO_{2+c}$ (in the formula, x, a, b, and c satisfy x+a+b=1, 0<x≤0.2, 0.09≤a, and −0.1≤c≤0.1) is satisfied and a phosphate compound and tungsten oxide coexist. If the phosphate compound and the tungsten oxide do not coexist, such an interaction is believed to be not obtained.

Furthermore, when the adsorption of moisture to the lithium transition metal composite oxide is suppressed, the amount of moisture used for the LiOH production reaction also decreases. Consequently, the LiOH production reaction that results in the degradation of the characteristics due to air exposure can be further suppressed, which further suppresses the degradation of the initial charge characteristics due to air exposure.

As a result of such a synergistic effect, the LiOH production reaction that results in the degradation of the characteristics due to air exposure can be suppressed, and thus the degradation of the initial charge characteristics due to air exposure can be considerably suppressed.

Any lithium transition metal composite oxide may be used as long as it is represented by general formula $Li_{1+x}Mn_aM_bO_{2+c}$ (in the formula, x, a, b, and c satisfy x+a+b=1, 0<x≤0.2, 0.09≤a, and −0.1≤c≤0.1, and M is at least one element selected from the group consisting of transition metal elements other than Mn, alkali metal elements, alkaline-earth metal elements, group 12 elements, group 13 elements, and group 14 elements) as described above. M preferably contains a divalent element and particularly preferably Ni from the viewpoint of structural stability so that the formal valence of Mn is 4 when Li has a valence of 1 and O has a valence of −2.

To further stabilize the structure, a lithium-nickel-cobalt-manganese oxide, which contains cobalt in addition to nickel, is preferred. More preferably, a lithium-nickel-cobalt-manganese oxide having a publicly known composition can be used. For example, the molar ratio of nickel, cobalt, and manganese is 5:2:3, 5:3:2, 6:2:2, 7:1:2, 7:2:1, or 8:1:1.

In the lithium transition metal composite oxide, x in the content (1+x) of Li preferably satisfies 0<x≤0.2.

This is because when 0<x, the interaction of $Mn^{4+}$ and $P_xO_y^{n-}$ increases in the presence of $WO_3$, which suppresses the adsorption of moisture in the air to the lithium transition metal composite oxide.

When x>0.2, the amount of alkalis left on the surface of the lithium transition metal composite oxide increases. Consequently, a slurry easily gelates in the process of producing a battery and the amount of transition metals used for an oxidation-reduction reaction decreases, which lowers the capacity of the positive electrode.

In view of the foregoing, x more preferably satisfies 0.05≤x≤0.1 and particularly preferably 0.07≤x≤0.1.

Furthermore, when M in the general formula $Li_{1+x}Mn_aM_bO_{2+c}$ contains zirconium (Zr), the degradation of the initial charge characteristics due to air exposure can be further suppressed. The lithium transition metal composite oxide may further contain other additional elements.

Examples of the additional elements include transition metal elements other than Mn, Ni, and Co, alkali metal elements, alkaline-earth metal elements, group 12 elements, group 13 elements, and group 14 elements. Specific examples of the additional elements include boron (B), magnesium (Mg), aluminum (Al), titanium (Ti), chromium (Cr), iron (Fe), copper (Cu), zinc (Zn), niobium (Nb), molybdenum (Mo), tungsten (W), tantalum (Ta), tin (Sn), sodium (Na), potassium (K), barium (Ba), strontium (Sr), and calcium (Ca).

The lithium transition metal composite oxide is present in the form of particles having an average particle size of 2 to 30 μm. The particles may be secondary particles formed by bonding primary particles having a particle size of 100 nm to 10 μm.

In the positive electrode for a nonaqueous electrolyte secondary battery according to this embodiment, tungsten oxide and a phosphate compound preferably adhere to the surface of the lithium transition metal composite oxide. This further produces a synergistic effect of the tungsten oxide and the phosphate compound, which further suppresses the degradation of the initial charge characteristics due to air exposure.

The tungsten oxide contained in the positive electrode is not particularly limited, but is preferably $WO_3$ because tungsten has a most stable oxidation number of 6.

The state in which the tungsten oxide is contained in the positive electrode is a state in which the tungsten oxide is present near the surfaces of the positive electrode active material particles formed of the lithium transition metal composite oxide. The tungsten oxide preferably adheres to the surfaces in a scattered manner and more preferably adheres to the surfaces in a uniformly scattered manner.

In such a state, the LiOH production reaction can be sufficiently suppressed on the entire surfaces of the lithium transition metal composite oxide particles.

If the amount of tungsten added is small, the above-described effect of tungsten is not sufficiently produced. If the amount of tungsten is excessively large, the surface of the lithium transition metal composite oxide is widely covered with tungsten oxide (the number of covered portions excessively increases). This degrades the charge-discharge characteristics of batteries.

Accordingly, in the positive electrode active material of the present invention, the content of tungsten in the positive electrode active material is preferably 0.05 mol % or more and 10 mol % or less, more preferably 0.1 mol % or more and 5 mol % or less, and further preferably 0.2 mol % or more and 3 mol % or less relative to the total content of transition metals in the lithium transition metal composite oxide.

The positive electrode containing tungsten oxide is produced by a method in which the lithium transition metal composite oxide and tungsten oxide are caused to adhere to each other by being mechanically mixed in advance or a method in which tungsten oxide is added in the process of kneading a conductive agent and a binding agent.

The particle size of the tungsten oxide particles is preferably smaller than that of the lithium transition metal composite oxide and particularly preferably smaller than ¼ of the particle size. If the particle size of the tungsten oxide is larger than that of the lithium transition metal composite oxide, the contact area between the tungsten oxide and the lithium transition metal composite oxide decreases, which may fail to produce a sufficient effect.

The phosphate compound contained in the positive electrode is not particularly limited. The phosphate compound is preferably lithium phosphate, lithium dihydrogen phosphate, cobalt phosphate, nickel phosphate, manganese phosphate, potassium phosphate, or ammonium dihydrogen phosphate. Among them, lithium phosphate is particularly preferred. The use of the phosphate compound further produces an effect of suppressing the degradation of the initial charge capacity due to air exposure.

The content of the phosphate compound is preferably 0.01 mass % or more and 1.5 mass % or less, more preferably 0.02 mass % or more and 1.2 mass % or less, and further preferably 0.1 mass % or more and 1.0 mass % or less relative to the total mass of the lithium transition metal composite oxide in terms of phosphorus.

If the content is less than 0.01 mass %, the effect of the tungsten oxide and the phosphate compound is not sufficiently produced and the degradation of the characteristics due to air exposure of electrode plates sometimes cannot be suppressed. If the content is more than 1.5 mass %, the amount of the positive electrode active material decreases by the excess amount of the compound, which decreases the capacity of the positive electrode.

The positive electrode containing a phosphate compound is produced by a method in which the lithium transition metal composite oxide and a phosphate compound are caused to adhere to each other by being mechanically mixed in advance or a method in which a phosphate compound is added in the process of kneading a conductive agent and a binding agent.

The particle size of the phosphate compound particles is preferably smaller than that of the lithium transition metal composite oxide and particularly preferably smaller than ¼ of the particle size. If the particle size of the phosphate compound is larger than that of the lithium transition metal composite oxide, the contact area between the phosphate compound and the lithium transition metal composite oxide decreases, which may fail to produce a sufficient effect.

Herein, it is sufficient that the phosphate compound is present near the tungsten oxide. In this case, the effect of the phosphate compound and the tungsten oxide is also produced. That is, the phosphate compound may adhere to the surfaces of the lithium transition metal composite oxide particles or may be present near the tungsten oxide in the positive electrode while not adhering to the surfaces. The phosphate compound is preferably caused to more selectively adhere to the surfaces of the lithium transition metal composite oxide particles by being mixed with the lithium transition metal composite oxide in advance. This is because the synergistic effect of the phosphate compound and the tungsten oxide increases.

In the nonaqueous electrolyte secondary battery of the present invention, other positive electrode active materials may be mixed with the above-described positive electrode active material. The other positive electrode active materials are not particularly limited as long as they are compounds capable of reversibly intercalating and deintercalating lithium. Examples of the compounds include compounds having a layered structure and being capable of intercalating and deintercalating lithium ions while a stable crystal structure is maintained, compounds having a spinel structure, and compounds having an olivine structure. When only positive electrode active materials of the same type are used or when different types of positive electrode active materials are used, the positive electrode active materials may have the same particle size or different particle sizes.

The binding agent may be, for example, a fluoropolymer or a rubber polymer. Examples of the fluoropolymer include polytetrafluoroethylene (PTFE), polyvinylidene fluoride (PVdF), and modified products of the foregoing. Examples of the rubber polymer include ethylene-propylene-isoprene copolymers and ethylene-propylene-butadiene copolymers. They may be used alone or in combination of two or more. The binding agent may be used together with a thickener such as carboxymethyl cellulose (CMC) or polyethylene oxide (PEO).

The conductive agent may be, for example, a carbon material such as carbon black, acetylene black, Ketjenblack, or graphite. They may be used alone or in combination of two or more.

The positive electrode active material for a nonaqueous electrolyte secondary battery according to an embodiment of the present invention contains a lithium transition metal composite oxide, tungsten oxide that adheres to the surface of the lithium transition metal composite oxide, and a phosphate compound that adheres to the surface of the lithium transition metal composite oxide. Thus, the synergistic effect of the tungsten oxide and the phosphate compound is produced, which suppresses the degradation of the initial charge characteristics due to air exposure.

[Negative Electrode]

The negative electrode may be a known negative electrode and is produced by, for example, mixing a negative electrode active material and a binding agent with water or an appropriate solvent, applying the resulting mixture to a negative electrode current collector, and drying and rolling the negative electrode current collector. The negative electrode current collector is suitably formed of, for example, a conductive thin film such as a metal foil or alloy foil of copper or the like which is stable in the potential range of a negative electrode or a film including a metal surface layer made of copper or the like. The binding agent may be, for example, PTFE as in the case of the positive electrode, but is preferably a styrene-butadiene copolymer (SBR) or a modified product thereof. The binding agent may be used together with a thickener such as CMC.

Any negative electrode active material capable of reversibly intercalating and deintercalating lithium ions can be used. Examples of the negative electrode active material include carbon materials, metals such as Si and Sn and alloy materials that form alloys with lithium, and metal composite oxides. These negative electrode active materials may be used alone or in combination of two or more. The negative electrode active material may be a combination of negative electrode active materials selected from carbon materials, metals and alloy materials that form alloys with lithium, and metal composite oxides.

[Nonaqueous Electrolyte]

The solvent of the nonaqueous electrolyte may be a known solvent. Examples of the solvent include cyclic carbonates such as ethylene carbonate, propylene carbonate, butylene carbonate, and vinylene carbonate; and chain carbonates such as dimethyl carbonate, methyl ethyl carbonate, and diethyl carbonate. In particular, a mixed solvent of the cyclic carbonate and the chain carbonate is preferably used as a nonaqueous solvent having a high lithium ion conductivity from the viewpoint of high dielectric constant, low viscosity, and low melting point. The volume ratio of the cyclic carbonate and the chain carbonate in the mixed solvent is preferably controlled to the range of 2:8 to 5:5.

Examples of compounds that can be used together with the above solvent include ester-containing compounds such as methyl acetate, ethyl acetate, propyl acetate, methyl propionate, ethyl propionate, and γ-butyrolactone; sulfone-containing compounds such as propane sultone; ether-containing compounds such as 1,2-dimethoxyethane, 1,2-diethoxyethane, tetrahydrofuran, 1,3-dioxane, 1,4-dioxane, and 2-methyltetrahydrofuran; nitrile-containing compounds such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and amide-containing compounds such as dimethylformamide. Furthermore, solvents obtained by replacing some of hydrogen atoms H of the above solvents with fluorine atoms F can also be used.

The solute of the nonaqueous electrolyte may be a known solute. Examples of the solute include fluorine-containing lithium salts such as $LiPF_6$, $LiBF_4$, $LiCF_3SO_3$, $LiN(FSO_2)_2$, $LiN(CF_3SO_2)_2$, $LiN(C_2FSO_2)_2$, $LiN(CF_3SO_2)(C_4F_9SO_2)$, $LiC(C_2F_5SO_2)_3$, and $LiAsF_6$. Furthermore, a lithium salt [a lithium salt containing at least one of P, B, O, S, N, and Cl (e.g., $LiClO_4$)] other than the fluorine-containing lithium salt may be added to the fluorine-containing lithium salt. In particular, the fluorine-containing lithium salt and a lithium salt containing an oxalato complex as an anion are preferably mixed from the viewpoint of forming a stable coating film on the surface of the negative electrode in a high-temperature environment.

Examples of the lithium salt containing an oxalato complex as an anion include LiBOB [lithium bis(oxalato)borate], $Li[B(C_2O_4)F_2]$, $Li[P(C_2O_4)F_4]$, and $Li[P(C_2O_4)_2F_2]$. In particular, LiBOB capable of forming a stable coating film on the negative electrode is preferably used.

These solutes may be used alone or in combination of two or more.

[Separator]

A known separator may be used. Examples of the separator include polypropylene separators, polyethylene separators, polypropylene-polyethylene multilayer separators, and separators whose surface is coated with a resin such as an aramid resin.

A layer formed of a known inorganic filler may be formed at an interface between the positive electrode and the separator or at an interface between the negative electrode and the separator. Examples of the filler include known oxides and phosphates containing one or more elements such as titanium, aluminum, silicon, and magnesium; and those obtained by surface-treating the oxides and phosphates with a hydroxide or the like.

The filler layer may be formed by, for example, directly applying a filler-containing slurry to the positive electrode, the negative electrode, or the separator, or pasting a sheet formed of the filler on the positive electrode, the negative electrode, or the separator.

EXAMPLES

Hereafter, the embodiment of the present invention will be further described in detail based on Experimental Examples. Experimental Examples below are merely examples for describing the positive electrode for nonaqueous electrolyte secondary batteries, the nonaqueous electrolyte secondary battery, and the positive electrode active material for nonaqueous electrolyte secondary batteries to embody the technical idea of the present invention. The present invention is not limited to Experimental Examples below and can be appropriately modified without changing the spirit of the present invention.

First Experimental Example

Experimental Example 1

[Production of Positive Electrode Active Material]

A nickel-cobalt-manganese composite hydroxide obtained by coprecipitation and represented by $[Ni_{0.5}Co_{0.20}Mn_{0.30}](OH)_2$ was fired at 500° C. to obtain a nickel-cobalt-manganese composite oxide. Then, lithium hydroxide and the obtained nickel-cobalt-manganese composite oxide were mixed with each other using an Ishikawa grinding mixer so that the molar ratio of lithium and all transition metals was 1.15:1. The resulting mixture was then fired in an air atmosphere at 900° C. for 10 hours and pulverized to obtain a lithium-nickel-manganese-cobalt composite oxide having an average secondary particle size of about 8 μm and represented by $Li_{1.07}[N_{0.465}Co_{0.186}Mn_{0.279}]O_2$.

The positive electrode active material particles represented by $Li_{1.07}[Ni_{0.465}Co_{0.186}Mn_{0.279}]O_2$, tungsten oxide ($WO_3$), and lithium phosphate were mixed with each other at a predetermined ratio to produce a positive electrode active material. The content of tungsten in the thus-produced positive electrode active material was 1.0 mol % relative to the total content of transition metals in the lithium transition metal composite oxide. The content of lithium phosphate in the positive electrode active material was 0.5 wt %.

[Production of Positive Electrode Plate]

The positive electrode active material, carbon black serving as a conductive agent, and an N-methyl-2-pyrrolidone solution prepared by dissolving polyvinylidene fluoride serving as a binding agent were weighed so that the mass ratio of the positive electrode active material, the conductive agent, and the binding agent was 92:5:3. They were kneaded to prepare a positive electrode mixture slurry.

Subsequently, the positive electrode mixture slurry was applied onto both surfaces of a positive electrode current collector formed of an aluminum foil, dried, and then rolled with a reduction roller. An aluminum current collecting tab was attached thereto to produce a positive electrode plate including positive electrode mixture layers formed on both surfaces of the positive electrode current collector.

The obtained positive electrode plate was observed with a scanning electron microscope (SEM). It was confirmed that tungsten oxide particles having an average particle size of 150 nm and lithium phosphate particles having an average particle size of 100 nm adhered to the surface of the lithium transition metal composite oxide. However, since part of the tungsten oxide and lithium phosphate may be separated from the surfaces of the positive electrode active material particles in the process of mixing a conductive agent and a binding agent, the tungsten oxide and lithium phosphate may be contained in the positive electrode while not adhering to the positive electrode active material particles. It was also confirmed that the lithium phosphate adhered to the tungsten oxide or was present near the tungsten oxide.

Figure 1:
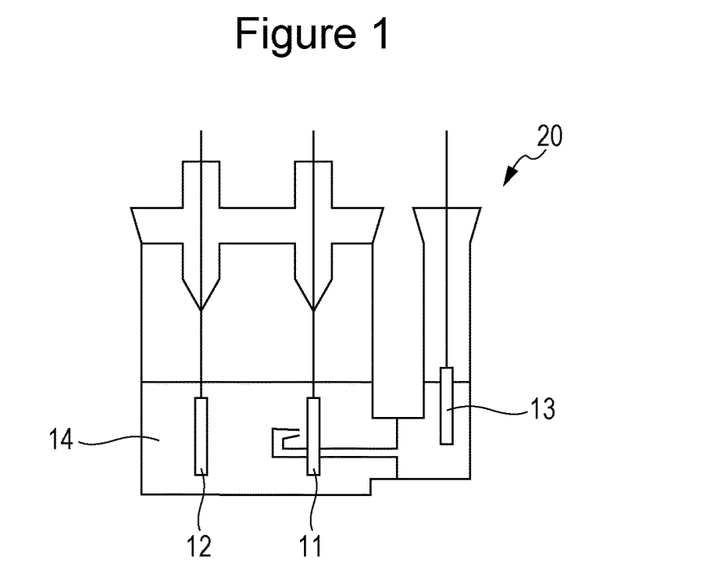
FIG. 1 schematically illustrates a three-electrode test cell used in Experimental Examples.

As illustrated in FIG. 1, a three-electrode test cell was produced using the thus-produced positive electrode as a working electrode 11 and metal lithium as a counter electrode 12, which serves as a negative electrode, and a reference electrode 13. A nonaqueous electrolytic solution 14 was prepared as follows. $LiPF_6$ was dissolved in a mixed solvent prepared by mixing ethylene carbonate, methyl ethyl carbonate, and dimethyl carbonate at a volume ratio of 3:3:4 so that the concentration of $LiPF_6$ was 1 mol/l. Furthermore, 1 mass % of vinylene carbonate was dissolved therein. The thus-produced battery is hereafter referred to as a battery A1.

[Production of Battery Using Positive Electrode Plate Exposed to Air]

A battery (battery B1) using a positive electrode plate exposed to the air was produced in the same manner as in the battery A1, except that the positive electrode plate was rolled with a reduction roller and then exposed to the air under the following conditions in the production thereof.

Air Exposure Conditions

The positive electrode plate was left to stand in a thermo-hygrostat at 60° C. and 30% for 3 days.

Experimental Example 2

A three-electrode test cell of Experimental Example 2 was produced in the same manner as in Experimental Example 1, except that the content of tungsten oxide relative to the positive electrode active material particles represented by $Li_{1.07}[Ni_{0.465}Co_{0.186}Mn_{0.279}]O_2$ was increased in the production of the positive electrode active material in Experimental Example 1. The thus-produced battery is hereafter referred to as a battery A2. The content of tungsten in the thus-produced positive electrode active material was 3.0 mol % relative to the total content of transition metals in the lithium transition metal composite oxide.

A battery (battery B2) using a positive electrode plate exposed to the air was produced in the same manner as in the battery A2, except that the positive electrode plate was rolled with a reduction roller and then exposed to the air under the above conditions in the production thereof.

Experimental Example 3

A three-electrode test cell of Experimental Example 3 was produced in the same manner as in Experimental Example 1, except that the content of lithium phosphate relative to the positive electrode active material particles represented by $Li_{1.07}[Ni_{0.465}Co_{0.186}Mn_{0.279}]O_2$ was increased in the production of the positive electrode active material in Experimental Example 1. The thus-produced battery is hereafter referred to as a battery A3. The content of the lithium phosphate in the thus-produced positive electrode active material was 3 wt %.

A battery (battery B3) using a positive electrode plate exposed to the air was produced in the same manner as in the battery A3, except that the positive electrode plate was rolled with a reduction roller and then exposed to the air under the above conditions in the production thereof.

Experimental Example 4

A three-electrode test cell of Experimental Example 4 was produced in the same manner as in Experimental Example 1, except that the tungsten oxide and the lithium phosphate were not added to the positive electrode active material particles represented by $Li_{1.07}[Ni_{0.465}Co_{0.186}Mn_{0.279}]O_2$ in the production of the positive electrode active material in Experimental Example 1. The thus-produced battery is hereafter referred to as a battery A4.

A battery (battery B4) using a positive electrode plate exposed to the air was produced in the same manner as in the battery A4, except that the positive electrode plate was rolled with a reduction roller and then exposed to the air under the above conditions in the production thereof.

Experimental Example 5

A three-electrode test cell of Experimental Example 5 was produced in the same manner as in Experimental Example 1, except that only the tungsten oxide was added to the positive electrode active material particles represented by $Li_{1.07}[Ni_{0.465}Co_{0.186}Mn_{0.279}]O_2$ in the production of the positive electrode active material in Experimental Example 1. The thus-produced battery is hereafter referred to as a battery A5.

A battery (battery B5) using a positive electrode plate exposed to the air was produced in the same manner as in the battery A5, except that the positive electrode plate was rolled with a reduction roller and then exposed to the air under the above conditions in the production thereof.

Experimental Example 6

A three-electrode test cell of Experimental Example 6 was produced in the same manner as in Experimental Example 5, except that the content of tungsten oxide relative to the positive electrode active material particles represented by $Li_{1.07}[Ni_{0.465}Co_{0.486}Mn_{0.279}]O_2$ was increased in the production of the positive electrode active material in Experimental Example 5. The thus-produced battery is hereafter referred to as a battery A6.

Figure 2:
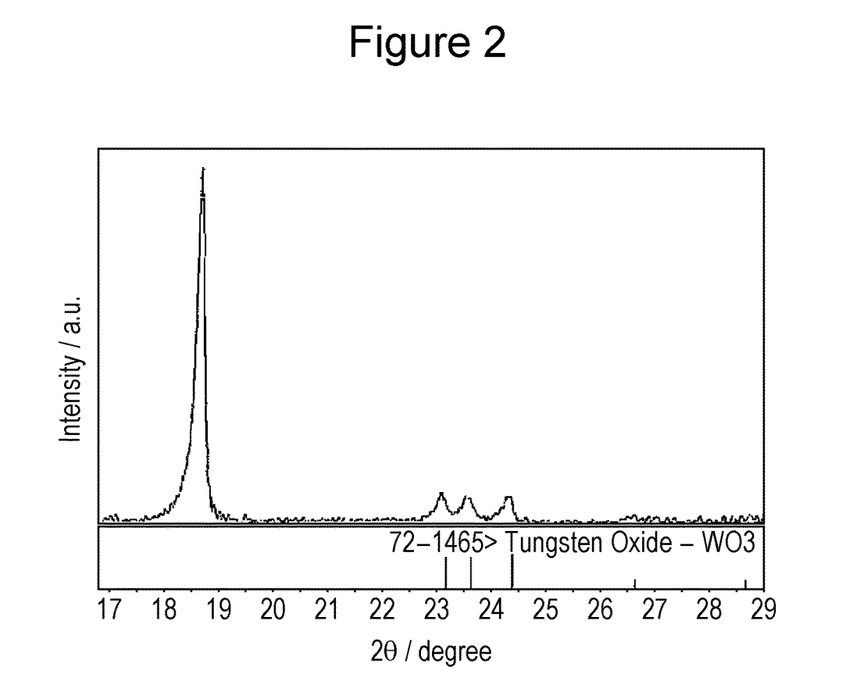
FIG. 2 illustrates XRD peaks of $WO_3$ in one Experimental Example of the present invention.

The content of tungsten in the thus-produced positive electrode active material was 3.0 mol % relative to the total content of transition metals in the lithium transition metal composite oxide. The positive electrode active material was measured by X-ray diffraction (XRD). As illustrated in FIG. 2, peaks derived from WO identified in JCPDS 72-1465 were observed.

A battery (battery B6) using a positive electrode plate exposed to the air was produced in the same manner as in the battery A6, except that the positive electrode plate was rolled with a reduction roller and then exposed to the air under the above conditions in the production thereof.

Experimental Example 7

A three-electrode test cell of Experimental Example 7 was produced in the same manner as in Experimental Example 1, except that only the lithium phosphate was added to the positive electrode active material particles represented by $Li_{1.07}[Ni_{0.465}Co_{0.486}Mn_{0.279}]O_2$ in the production of the positive electrode active material in Experimental Example 1. The thus-produced battery is hereafter referred to as a battery A7.

A battery (battery B7) using a positive electrode plate exposed to the air was produced in the same manner as in the battery A7, except that the positive electrode plate was rolled with a reduction roller and then exposed to the air under the above conditions in the production thereof.

Experimental Example 8

A three-electrode test cell of Experimental Example 8 was produced in the same manner as in Experimental Example 7, except that the content of lithium phosphate relative to the positive electrode active material particles represented by $Li_{1.07}[Ni_{0.465}Co_{0.486}Mn_{0.279}]O_2$ was increased in the production of the positive electrode active material in Experimental Example 7. The thus-produced battery is hereafter referred to as a battery A8. The content of the lithium phosphate in the thus-produced positive electrode active material was 3 wt %.

A battery (battery B8) using a positive electrode plate exposed to the air was produced in the same manner as in the battery A8, except that the positive electrode plate was rolled with a reduction roller and then exposed to the air under the above conditions in the production thereof.

<Charge Conditions>

Constant current charge was performed at a current density of 0.2 mA/cm$^2$ at 25° C. until the voltage reached 4.3 V (vs. Li/Li$^+$), and constant voltage charge was performed at a constant voltage of 4.3 V (vs. Li/Li$^+$) until the current density reached 0.04 mA/cm$^2$.

<Calculation of Charge Capacity Degradation Percentage Due to Air Exposure>

Among the determined initial charge capacities, the initial charge capacity without air exposure (the positive electrode plate was not exposed to the air) was defined as an "initial charge capacity without exposure", and the initial charge capacity with air exposure (the positive electrode plate was exposed to the air) was defined as an "initial charge capacity with exposure". The degraded charge capacity due to air exposure was calculated from the difference between the initial charge capacity without exposure and the initial charge capacity with exposure of the corresponding battery on the basis of the formula (1) below.

Assuming that the charge capacity degradation percentage due to air exposure in Experimental Example (Experimental Example 4) in which neither the tungsten oxide nor the lithium phosphate was added was "100", the charge capacity degradation percentage due to air exposure in each of Experimental Examples was determined.

Degraded charge capacity=(Initial charge capacity without exposure)−(Initial charge capacity with exposure)   (1)

Table 1 below collectively shows the results.

Furthermore, there is almost no difference in charge capacity degradation percentage due to air exposure between the batteries of Experimental Examples 5 and 6 in which only the tungsten oxide adheres and the batteries of Experimental Examples 7 and 8 in which only the lithium phosphate adheres, and the battery of Experimental Example 4 in which neither of them adheres. However, the batteries of Experimental Examples 1 to 3 in which the tungsten oxide and the lithium phosphate adhere to the surfaces of the lithium transition metal composite oxide particles produce an effect much larger than the individual effects of Experimental Examples 5 to 8. The reason for such results is believed to be as follows.

In the case of the batteries of Experimental Examples 1 to 3 in which both the tungsten oxide and the lithium phosphate adhere to the surface of the lithium transition metal composite oxide, the tungsten oxide suppresses the progress of the LiOH production reaction that results in the degradation of the characteristics due to air exposure. Therefore, the degradation of the initial charge characteristics due to air exposure, that is, the decrease in the charge capacity during charge after air exposure is believed to be suppressed.

Furthermore, a specific interaction between Mn$^{4+}$ in the lithium transition metal composite oxide and PO$_4^{3-}$ in Li$_3$PO$_4$ suppresses the adsorption of moisture in the air to the lithium transition metal compound. The decrease in the amount of the adsorption of moisture further suppresses the progress of the LiOH production reaction that results in the degradation of the characteristics due to air exposure. Thus, the degradation of the initial charge characteristics due to air exposure is believed to be further suppressed.

As a result of such a synergistic effect, the LiOH production reaction that results in the degradation of the characteristics due to air exposure can be suppressed. Thus, the degradation of the initial charge characteristics due to air exposure, that is, the decrease in the charge capacity during charge and discharge after air exposure can be considerably suppressed.

TABLE 1

|  | Composition | WO$_3$ added | Li$_3$PO$_4$ added | Charge capacity degradation percentage due to air exposure (%) |
|---|---|---|---|---|
| Experimental Example 1 | Li$_{1.07}$Ni$_{0.465}$Co$_{0.186}$Mn$_{0.279}$O$_2$ | 1 mol % | 0.5 wt % | 41 |
| Experimental Example 2 | Li$_{1.07}$Ni$_{0.465}$Co$_{0.186}$Mn$_{0.279}$O$_2$ | 3 mol % | 0.5 wt % | 33 |
| Experimental Example 3 | Li$_{1.07}$Ni$_{0.465}$Co$_{0.186}$Mn$_{0.279}$O$_2$ | 1 mol % | 3 wt % | 15 |
| Experimental Example 4 | Li$_{1.07}$Ni$_{0.465}$Co$_{0.186}$Mn$_{0.279}$O$_2$ | — | — | 100 |
| Experimental Example 5 | Li$_{1.07}$Ni$_{0.465}$Co$_{0.186}$Mn$_{0.279}$O$_2$ | 1 mol % | — | 82 |
| Experimental Example 6 | Li$_{1.07}$Ni$_{0.465}$Co$_{0.186}$Mn$_{0.279}$O$_2$ | 3 mol % | — | 76 |
| Experimental Example 7 | Li$_{1.07}$Ni$_{0.465}$Co$_{0.186}$Mn$_{0.279}$O$_2$ | — | 0.5 wt % | 102 |
| Experimental Example 8 | Li$_{1.07}$Ni$_{0.465}$Co$_{0.186}$Mn$_{0.279}$O$_2$ | — | 3 wt % | 104 |

As is clear from the results in Table 1 above, the charge capacity degradation percentage due to air exposure is much lower in the batteries of Experimental Examples 1 to 3 in which the tungsten oxide and the lithium phosphate adhere to the surfaces of the lithium transition metal composite oxide particles than in the batteries of Experimental Examples 4 to 8.

The above-described interaction is an interaction obtained when the general formula Li$_{1+x}$Mn$_a$M$_b$O$_{2+c}$ (in the formula, x, a, b, and c satisfy x+a+b=1, 0<x≤0.2, 0.09≤a, and −0.1≤c≤0.1) is satisfied and the phosphate compound and the tungsten oxide coexist. If the phosphate compound is present alone, such an interaction is believed to be not obtained.

In the case of the batteries of Experimental Examples 5 and 6 in which only the tungsten oxide adheres, the synergistic effect of the tungsten oxide and the lithium phosphate is not produced. That is, the presence of the tungsten oxide slightly suppresses the LiOH production reaction that results in the degradation due to air exposure. However, since the phosphate compound is not present, the amount of moisture adsorbed onto the surface of the lithium transition metal composite oxide increases. Therefore, the progress of the LiOH production reaction that results in the degradation due to air exposure is accelerated. Thus, the degradation of the initial charge characteristics due to air exposure is believed to be not sufficiently suppressed.

In the case of the batteries of Experimental Examples 7 and 8 in which only the lithium phosphate adheres, the synergistic effect of the tungsten oxide and the lithium phosphate is also not produced. That is, when the lithium phosphate is not present together with the tungsten oxide, but is present alone, the adsorption of moisture in the air to the lithium transition metal composite oxide cannot be suppressed as described above, which is believed to accelerate the progress of the LiOH production reaction.

Furthermore, since the tungsten oxide is not present in the batteries of Experimental Examples 7 and 8, the effect of suppressing the LiOH production reaction by the tungsten oxide is believed to be also not produced. That is, only the adhesion of the phosphate compound as in the batteries of Experimental Examples 7 and 8 does not produce an effect of suppressing the degradation of the initial charge characteristics due to air exposure.

In the case of the battery of Experimental Example 4, neither the tungsten oxide nor the lithium phosphate adheres to the surface of the lithium transition metal compound. Therefore, neither the effect produced by the tungsten oxide nor the synergistic effect produced by the tungsten oxide and the lithium phosphate is achieved. Consequently, the LiOH production reaction cannot be suppressed, and the degradation of the initial charge characteristics due to air exposure is believed to be not suppressed.

Second Experimental Example

Experimental Example 9

A three-electrode test cell of Experimental Example 9 was produced in the same manner as in Experimental Example 1, except that the nickel-cobalt-manganese composite, lithium hydroxide, and nickel-cobalt-manganese composite oxide used in Experimental Example 1 and zirconium oxide ($ZrO_2$) were mixed with each other using an Ishikawa grinding mixer so that the molar ratio of lithium, nickel-cobalt-manganese as a whole of the transition metals, and zirconium was 1.15:1:0.005, and the resulting mixture was fired. The thus-produced battery is hereafter referred to as a battery A9.

A battery (battery B9) using a positive electrode plate exposed to the air was produced in the same manner as in the battery A9, except that the positive electrode plate was rolled with a reduction roller and then exposed to the air under the above conditions in the production thereof.

Experimental Example 10

A three-electrode test cell of Experimental Example 10 was produced in the same manner as in Experimental Example 9, except that the tungsten oxide and the lithium phosphate were not added in the production of the positive electrode active material in Experimental Example 9. The thus-produced battery is hereafter referred to as a battery A10.

A battery (battery B10) using a positive electrode plate exposed to the air was produced in the same manner as in the battery A10, except that the positive electrode plate was rolled with a reduction roller and then exposed to the air under the above conditions in the production thereof.

The charge capacity degradation percentage due to air exposure was determined using the batteries of Experimental Examples 9 and 10 in the same manner as in First Experimental Example. Assuming that the charge capacity degradation percentage due to air exposure in Experimental Example (Experimental Example 10) in which neither the tungsten oxide nor the lithium phosphate was added was "100", the charge capacity degradation percentage due to air exposure in Experimental Example 9 was determined. Table 2 below collectively shows the results together with the results of the batteries of Experimental Examples 1 and 4.

TABLE 2

| | Composition | $WO_3$ added | $Li_3PO_4$ added | Charge capacity degradation percentage due to air exposure (%) |
|---|---|---|---|---|
| Experimental Example 1 | $Li_{1.07}Ni_{0.465}Co_{0.186}Mn_{0.279}O_2$ | 1 mol % | 0.5 wt % | 41 |
| Experimental Example 4 | $Li_{1.07}Ni_{0.465}Co_{0.186}Mn_{0.279}O_2$ | — | — | 100 |
| Experimental Example 9 | $Li_{1.067}Ni_{0.464}Co_{0.186}Mn_{0.278}Zr_{0.005}O_2$ | 1 mol % | 0.5 wt % | 17 |
| Experimental Example 10 | $Li_{1.067}Ni_{0.464}Co_{0.186}Mn_{0.278}Zr_{0.005}O_2$ | — | — | 100 |

As is clear from the results in Table 2 above, in the battery of Experimental Example 9 in which the zirconium oxide is mixed together with the lithium hydroxide and the transition metal composite oxide in the production of the lithium transition metal composite oxide, the degradation of the initial charge characteristics due to air exposure is considerably suppressed compared with the battery of Experimental Example 10 in which neither the tungsten oxide nor the lithium phosphate adheres to the surface of the lithium transition metal compound.

It has been also found that the effect of suppressing the degradation is larger in Experimental Example 9 than in Experimental Example 1 in which zirconium oxide is not added in the production of the lithium transition metal composite oxide.

The effect of zirconium is still unclear, but is believed to be as follows. The adsorption of moisture in the air to the lithium transition metal compound is suppressed, which further suppresses the progress of the LiOH production reaction that results in the degradation of the characteristics due to air exposure. Therefore, the degradation of the initial charge characteristics due to air exposure can be further suppressed.

Third Experimental Example

Experimental Example 11

A nickel-cobalt-manganese composite hydroxide obtained by coprecipitation and represented by $[Ni_{0.70}Co_{0.20}Mn_{0.10}](OH)_2$ was fired at 500° C. to obtain a nickel-cobalt-manganese composite oxide. Then, lithium hydroxide and the obtained nickel-cobalt-manganese composite oxide were mixed with each other using an Ishikawa grinding mixer so that the molar ratio of lithium and all transition metals was 1.05:1.

The resulting mixture was then fired in an oxygen atmosphere at 850° C. for 10 hours and pulverized to obtain a lithium nickelate composite oxide having an average secondary particle size of about 14 μm and represented by $Li_{1.024}[Ni_{0.683}Co_{0.195}Mn_{0.098}]O_2$.

A three-electrode test cell of Experimental Example 11 was produced in the same manner as in Experimental Example 1, except that the positive electrode active material particles represented by $Li_{1.024}[Ni_{0.683}Co_{0.195}Mn_{0.098}]O_2$ were used. The thus-produced battery is hereafter referred to as a battery A11.

A battery (battery B11) using a positive electrode plate exposed to the air was produced in the same manner as in the battery A11, except that the positive electrode plate was rolled with a reduction roller and then exposed to the air under the above conditions in the production thereof.

Experimental Example 12

A three-electrode test cell of Experimental Example 12 was produced in the same manner as in Experimental Example 11, except that the tungsten oxide and the lithium phosphate were not added to the positive electrode active material particles represented by $Li_{1.024}[Ni_{0.683}Co_{0.195}Mn_{0.098}]O_2$ in the production of the positive electrode active material in Experimental Example 11. The thus-produced battery is hereafter referred to as a battery A12.

A battery (battery B12) using a positive electrode plate exposed to the air was produced in the same manner as in the battery A12, except that the positive electrode plate was rolled with a reduction roller and then exposed to the air under the above conditions in the production thereof.

Experimental Example 13

A three-electrode test cell of Experimental Example 13 was produced in the same manner as in Experimental Example 11, except that only the tungsten oxide was added to the positive electrode active material particles represented by $Li_{1.024}[Ni_{0.683}Co_{0.195}Mn_{0.098}]O_2$ in the production of the positive electrode active material in Experimental Example 11. The thus-produced battery is hereafter referred to as a battery A13.

A battery (battery B13) using a positive electrode plate exposed to the air was produced in the same manner as in the battery A13, except that the positive electrode plate was rolled with a reduction roller and then exposed to the air under the above conditions in the production thereof.

Experimental Example 14

A three-electrode test cell of Experimental Example 14 was produced in the same manner as in Experimental Example 11, except that only the lithium phosphate was added to the positive electrode active material particles represented by $Li_{1.024}[Ni_{0.683}Co_{0.195}Mn_{0.098}]O_2$ in the production of the positive electrode active material in Experimental Example 11. The thus-produced battery is hereafter referred to as a battery A14.

A battery (battery B14) using a positive electrode plate exposed to the air was produced in the same manner as in the battery A14, except that the positive electrode plate was rolled with a reduction roller and then exposed to the air under the above conditions in the production thereof.

Experimental Example 15

A nickel-cobalt-aluminum composite hydroxide obtained by coprecipitation and represented by $[Ni_{0.82}Co_{0.15}Al_{0.03}](OH)_2$ was fired at 500° C. to obtain a nickel-cobalt-aluminum composite oxide. Then, lithium hydroxide and the obtained nickel-cobalt-aluminum composite oxide were mixed with each other using an Ishikawa grinding mixer so that the molar ratio of lithium and all transition metals was 1.03:1.

The resulting mixture was then fired in an oxygen atmosphere at 850° C. for 10 hours and pulverized to obtain a lithium nickelate composite oxide having an average secondary particle size of about 14 μm and represented by $Li_{1.015}[Ni_{0.808}Co_{0.148}Al_{0.029}]O_2$.

A three-electrode test cell of Experimental Example 15 was produced in the same manner as in Experimental Example 1, except that the positive electrode active material particles represented by $Li_{1.015}[Ni_{0.808}Co_{0.148}Al_{0.029}]O_2$ were used. The thus-produced battery is hereafter referred to as a battery A15.

A battery (battery B15) using a positive electrode plate exposed to the air was produced in the same manner as in the battery A15, except that the positive electrode plate was rolled with a reduction roller and then exposed to the air under the above conditions in the production thereof.

(Experimental Example 16) A three-electrode test cell of Experimental Example 16 was produced in the same manner as in Experimental Example 15, except that the tungsten oxide and the lithium phosphate were not added to the positive electrode active material particles represented by $Li_{1.015}[Ni_{0.808}Co_{0.148}Al_{0.029}]O_2$ in the production of the positive electrode active material in Experimental Example 15. The thus-produced battery is hereafter referred to as a battery A16.

A battery (battery B16) using a positive electrode plate exposed to the air was produced in the same manner as in the battery A16, except that the positive electrode plate was rolled with a reduction roller and then exposed to the air under the above conditions in the production thereof.

Experimental Example 17

A three-electrode test cell of Experimental Example 17 was produced in the same manner as in Experimental Example 15, except that only the tungsten oxide was added to the positive electrode active material particles represented by $Li_{1.015}[Ni_{0.808}Co_{0.148}Al_{0.029}]O_2$ in the production of the positive electrode active material in Experimental Example 15. The thus-produced battery is hereafter referred to as a battery A17.

A battery (battery B17) using a positive electrode plate exposed to the air was produced in the same manner as in the battery A17, except that the positive electrode plate was rolled with a reduction roller and then exposed to the air under the above conditions in the production thereof.

Experimental Example 18

A three-electrode test cell of Experimental Example 18 was produced in the same manner as in Experimental Example 15, except that only the lithium phosphate was added to the positive electrode active material particles represented by $Li_{1.015}[Ni_{0.808}Co_{0.148}Al_{0.029}]O_2$ in the production of the positive electrode active material in Experimental Example 15. The thus-produced battery is hereafter referred to as a battery A18.

A battery (battery B18) using a positive electrode plate exposed to the air was produced in the same manner as in the battery A18, except that the positive electrode plate was rolled with a reduction roller and then exposed to the air under the above conditions in the production thereof.

Experimental Example 19

A nickel-cobalt-manganese composite hydroxide obtained by coprecipitation and represented by $[Ni_{0.80}Co_{0.15}Mn_{0.05}](OH)_2$ was fired at 500° C. to obtain a nickel-cobalt-manganese composite oxide. Then, lithium hydroxide and the obtained nickel-cobalt-manganese composite oxide were mixed with each other using an Ishikawa grinding mixer so that the molar ratio of lithium and all transition metals was 1.05:1.

The resulting mixture was then fired in an oxygen atmosphere at 850° C. for 10 hours and pulverized to obtain a lithium nickelate composite oxide having an average secondary particle size of about 14 μm and represented by $Li_{1.024}[Ni_{0.781}Co_{0.146}Mn_{0.049}]O_2$.

A three-electrode test cell of Experimental Example 19 was produced in the same manner as in Experimental Example 1, except that the positive electrode active material particles represented by $Li_{1.024}[Ni_{0.781}Co_{0.146}Mn_{0.049}]O_2$ were used. The thus-produced battery is hereafter referred to as a battery A19.

A battery (battery B19) using a positive electrode plate exposed to the air was produced in the same manner as in the battery A19, except that the positive electrode plate was rolled with a reduction roller and then exposed to the air under the above conditions in the production thereof.

Experimental Example 20

A three-electrode test cell of Experimental Example 20 was produced in the same manner as in Experimental Example 19, except that the tungsten oxide and the lithium phosphate were not added to the positive electrode active material particles represented by $Li_{1.024}[Ni_{0.781}Co_{0.146}Mn_{0.049}]$ in the production of the positive electrode active material in Experimental Example 19. The thus-produced battery is hereafter referred to as a battery A20.

A battery (battery B20) using a positive electrode plate exposed to the air was produced in the same manner as in the battery A20, except that the positive electrode plate was rolled with a reduction roller and then exposed to the air under the above conditions in the production thereof.

The charge capacity degradation percentage due to air exposure was determined using the batteries of Experimental Examples 11 to 20 in the same manner as in First Experimental Example. Assuming that the charge capacity degradation percentage due to air exposure in Experimental Examples (Experimental Example 12, Experimental Example 16, and Experimental Example 20) in which neither the tungsten oxide nor the lithium phosphate was added was "100", the charge capacity degradation percentage due to air exposure in each of Experimental Examples was determined. Table 3 below collectively shows the results together with the results of the batteries in Experimental Examples 1 and 4.

TABLE 3

| | Composition | $WO_3$ added | $Li_3PO_4$ added | Charge capacity degradation percentage due to air exposure (%) |
|---|---|---|---|---|
| Experimental Example 1 | $Li_{1.07}Ni_{0.465}Co_{0.186}Mn_{0.279}O_2$ | 1 mol % | 0.5 wt % | 41 |
| Experimental Example 4 | $Li_{1.07}Ni_{0.465}Co_{0.186}Mn_{0.279}O_2$ | — | — | 100 |
| Experimental Example 11 | $Li_{1.024}Ni_{0.683}Co_{0.195}Mn_{0.098}O_2$ | 1 mol % | 0.5 wt % | 37 |
| Experimental Example 12 | $Li_{1.024}Ni_{0.683}Co_{0.195}Mn_{0.098}O_2$ | — | — | 100 |
| Experimental Example 13 | $Li_{1.024}Ni_{0.683}Co_{0.195}Mn_{0.098}O_2$ | 1 mol % | — | 83 |
| Experimental Example 14 | $Li_{1.024}Ni_{0.683}Co_{0.195}Mn_{0.098}O_2$ | — | 0.5 wt % | 107 |
| Experimental Example 15 | $Li_{1.015}Ni_{0.808}Co_{0.148}Al_{0.029}O_2$ | 1 mol % | 0.5 wt % | 90 |
| Experimental Example 16 | $Li_{1.015}Ni_{0.808}Co_{0.148}Al_{0.029}O_2$ | — | — | 100 |
| Experimental Example 17 | $Li_{1.015}Ni_{0.808}Co_{0.148}Al_{0.029}O_2$ | 1 mol % | — | 85 |
| Experimental Example 18 | $Li_{1.015}Ni_{0.808}Co_{0.148}Al_{0.029}O_2$ | — | 0.5 wt % | 98 |
| Experimental Example 19 | $Li_{1.024}Ni_{0.781}Co_{0.146}Mn_{0.049}O_2$ | 1 mol % | 0.5 wt % | 85 |

TABLE 3-continued

|  | Composition | WO$_3$ added | Li$_3$PO$_4$ added | Charge capacity degradation percentage due to air exposure (%) |
|---|---|---|---|---|
| Experimental Example 20 | Li$_{1.024}$Ni$_{0.781}$Co$_{0.146}$Mn$_{0.049}$O$_2$ | — | — | 100 |

As is clear from the results in Table 3 above, in the battery of Experimental Example 11, the degradation of the initial charge characteristics due to air exposure can be considerably suppressed as in the case of the battery of Experimental Example 1.

In the batteries of Experimental Examples 15 and 19, the degradation of the initial charge characteristics due to air exposure is not sufficiently suppressed.

The reason for this is believed to be as follows. Since the Mn content in the positive electrode active material particles used in the batteries of Experimental Examples 15 and 19 is lower than 9 mol %, suppressing the adsorption of moisture in the air by the specific interaction of Mn$^{4+}$ and PO$_4^{3-}$ is insufficient. Consequently, the LiOH production reaction is not suppressed, and the degradation of the initial charge characteristics due to air exposure is not suppressed.

INDUSTRIAL APPLICABILITY

The positive electrode for nonaqueous electrolyte secondary batteries according to an aspect of the present invention and the nonaqueous electrolyte secondary battery that uses the positive electrode can be applied to driving power supplies for mobile information terminals, such as cellar phones, notebook computers, smartphones, and tablet terminals, that are particularly required to have high energy density. They are also promising for high-output uses such as electric vehicles (EVs), hybrid electric vehicles (HEVs, PHEVs), and power tools.

REFERENCE SIGNS LIST 11 working electrode (positive electrode)
12 counter electrode (negative electrode)
13 reference electrode
14 nonaqueous electrolytic solution
20 three-electrode test cell

The invention claimed is:

1. A positive electrode for a nonaqueous electrolyte secondary battery, comprising:
a lithium transition metal composite oxide secondary particle represented by general formula Li$_{1+x}$Mn$_a$M$_b$O$_{2+c}$ (in the formula, x, a, b, and c satisfy x+a+b=1, 0<x≤0.2, 0.09≤a, and −0.1≤c≤0.1, and M is at least one element selected from the group consisting of transition metal elements other than Mn, alkali metal elements, alkaline-earth metal elements, group 12 elements, group 13 elements, and group 14 elements); and
tungsten oxide and a lithium phosphate adhered to a surface of the lithium transition metal composite oxide secondary particle,
wherein a content of the lithium phosphate adhered to the surface of the lithium transition metal composite oxide secondary particle is 0.01 mass % or more and 1.5 mass % or less relative to a total mass of the lithium transition composite metal oxide in terms of phosphorous, and
a particle size of the tungsten oxide is smaller than ¼ of that of the lithium transition composite metal oxide secondary particle,
a particle size of the lithium phosphate is smaller than ¼ of that of the lithium transition composite metal oxide secondary particle.

2. The positive electrode for a nonaqueous electrolyte secondary battery according to claim 1, wherein the tungsten oxide is WO$_3$.

3. The positive electrode for a nonaqueous electrolyte secondary battery according to claim 1, wherein the lithium phosphate compound is Li$_3$PO$_4$.

4. The positive electrode for a nonaqueous electrolyte secondary battery according to claim 1, wherein M comprises Ni.

5. The positive electrode for a nonaqueous electrolyte secondary battery according to claim 1, wherein M comprises Zr.

6. A positive electrode for a nonaqueous electrolyte secondary battery according to claim 1, wherein the lithium phosphate adheres only on the surface of secondary particles of the lithium transition metal composite oxide.

7. A positive electrode for a nonaqueous electrolyte secondary battery according to claim 1, wherein an average particle size of the tungsten oxide is larger than an average particle size of the lithium phosphate.

8. A positive electrode for a nonaqueous electrolyte secondary battery according to claim 1, wherein the content of tungsten is 0.05 mol % or more and 10 mol % or less relative to the total content of transition metals in the lithium transition metal composite oxide secondary particle.

9. A nonaqueous electrolyte secondary battery comprising:
a positive electrode,
wherein the positive electrode comprises a lithium transition metal composite oxide represented by general formula Li$_{1+x}$Mn$_a$M$_b$O$_{2+c}$ (in the formula, x, a, b, and c satisfy x+a+b=1, 0<x≤0.2, 0.09≤a, and −0.1≤c≤0.1, and M is at least one element selected from the group consisting of transition metal elements other than Mn, alkali metal elements, alkaline-earth metal elements, group 12 elements, group 13 elements, and group 14 elements); and
tungsten oxide and a lithium phosphate adhered to a surface of the lithium transition metal composite oxide secondary particle,
wherein a content of the lithium phosphate adhered to the surface of the lithium transition metal composite oxide secondary particle is 0.01 mass % or more and 1.5 mass % or less relative to a total mass of the lithium transition composite metal oxide in terms of phosphorous, and
a particle size of the tungsten oxide is smaller than ¼ of that of the lithium transition composite metal oxide secondary particle, a particle size of the lithium phosphate is smaller than ¼ of that of the lithium transition composite metal oxide secondary particle.

10. The nonaqueous electrolyte secondary battery according to claim 9, wherein the tungsten oxide is $WO_3$.

11. The nonaqueous electrolyte secondary battery according to claim 9, wherein the phosphate compound is lithium phosphate.

12. The nonaqueous electrolyte secondary battery according to claim 9, wherein M comprises Ni.

13. The nonaqueous electrolyte secondary battery according to claim 9, wherein M comprises Zr.

* * * * *